United States Patent
Kawaguchi et al.

(10) Patent No.: US 10,020,123 B2
(45) Date of Patent: Jul. 10, 2018

(54) CARBON FIBER MEMBRANE

(71) Applicant: HONDA MOTOR CO., LTD., Tokyo (JP)

(72) Inventors: Yusuke Kawaguchi, Tochigi (JP); Satoshi Aoki, Tochigi (JP); Toshiaki Shimizu, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 84 days.

(21) Appl. No.: 15/035,656

(22) PCT Filed: Nov. 4, 2014

(86) PCT No.: PCT/JP2014/079219
§ 371 (c)(1),
(2) Date: May 10, 2016

(87) PCT Pub. No.: WO2015/072370
PCT Pub. Date: May 21, 2015

(65) Prior Publication Data
US 2016/0276111 A1 Sep. 22, 2016

(30) Foreign Application Priority Data
Nov. 13, 2013 (JP) ................................ 2013-235256

(51) Int. Cl.
*H01B 1/04* (2006.01)
*B82Y 30/00* (2011.01)
*H01G 11/36* (2013.01)
*C01B 32/158* (2017.01)

(52) U.S. Cl.
CPC .............. *H01G 11/36* (2013.01); *B82Y 30/00* (2013.01); *C01B 32/158* (2017.08); *C01B 2202/34* (2013.01); *Y02E 60/13* (2013.01); *Y10S 977/742* (2013.01); *Y10S 977/932* (2013.01)

(58) Field of Classification Search
CPC ..... C01B 2202/34; C01B 32/158; H01B 1/04; B82Y 30/00
USPC .............. 252/500, 502, 510; 977/762, 765
See application file for complete search history.

(56) References Cited

U.S. PATENT DOCUMENTS

| | | | | |
|---|---|---|---|---|
| 8,636,972 | B1* | 1/2014 | Imholt | B01J 19/087 252/500 |
| 2010/0173228 | A1* | 7/2010 | Wallace | H01M 4/8605 429/532 |
| 2012/0301812 | A1* | 11/2012 | Zheng | B82Y 30/00 429/487 |
| 2013/0089790 | A1 | 4/2013 | Byon et al. | |
| 2013/0216922 | A1* | 8/2013 | Zheng | H01M 4/9041 429/405 |
| 2014/0268495 | A1* | 9/2014 | Do | H01G 11/36 361/502 |

FOREIGN PATENT DOCUMENTS

| | | | |
|---|---|---|---|
| CN | 1417879 | 5/2003 | |
| JP | 2000-124079 | 4/2000 | |
| JP | 2006-032371 | 2/2006 | |
| JP | 2007-200979 | 8/2007 | |
| JP | 2008-010681 | 1/2008 | |
| JP | 2009-246306 | 10/2009 | |
| JP | 2009246306 | * 10/2009 | ............. B82Y 99/00 |
| JP | 2013-098085 | 5/2013 | |
| WO | 2012/073998 | 6/2012 | |
| WO | 2012-088697 | 7/2012 | |
| WO | 2014/192776 | 12/2014 | |

OTHER PUBLICATIONS

Self-assembled reduced graphene oxide/carbon nanotube thin films as electrodes for supercapacitors, Zhen-Dong Huang et al., Journal of Materials Chemistry, Received Oct. 7, 2011, English text.
International Search Report, dated Jan. 6, 2015 (Jan. 6, 2015).
Chinese Office Action dated Jan. 12, 2017.

* cited by examiner

*Primary Examiner* — Tri V Nguyen
(74) *Attorney, Agent, or Firm* — Rankin, Hill & Clark LLP

(57) ABSTRACT

Provided is a carbon fiber membrane which is inexpensive and can sufficiently increase the electric capacity per mass. The carbon fiber membrane includes only carbon nanotubes and carbon material other than carbon nanotubes, and the carbon nanotubes each having a fiber length of 30 to 500 μm are contained in an amount of 3% by mass or more to less than 100% by mass with respect to the total amount.

7 Claims, 2 Drawing Sheets

CARBON FIBER MEMBRANE

TECHNICAL FIELD

The present invention relates to a carbon fiber membrane used in a polarizable electrode of an electrical double-layer capacitor or the like.

BACKGROUND ART

Carbon nanotube has a larger specific surface area compared to activated carbon, and therefore has been considered to be used as a carbon fiber membrane in a polarizable electrode of an electrical double-layer capacitor or the like. On the other hand, carbon nanotube is expensive and the increase of manufacturing cost of the polarizable electrode of the electrical double-layer capacitor or the like is unavoidable if only carbon nanotubes are used.

In this regard, conventionally, there is known a carbon fiber membrane in which carbon nanotubes and carbon material other than carbon nanotubes which is more inexpensive are combined by a binder (for example, refer to Patent Literature 1 and Patent Literature 2).

CITATION LIST

Patent Literature

Patent Literature 1: Japanese Patent Laid-Open No. 2000-124079

Patent Literature 2: Japanese Patent Laid-Open No. 2008-10681

SUMMARY OF INVENTION

Technical Problem

However, since the binder generally does not have conductivity, there is a disadvantage that the electric capacity per mass cannot be sufficiently increased by the conventional carbon fiber membrane.

An object of the present invention is to eliminate such disadvantage and to provide a carbon fiber membrane which is inexpensive and can sufficiently increase the electric capacity per mass.

Solution to Problem

In order to achieve the object, the carbon fiber membrane of the present invention is a carbon fiber membrane comprising only carbon nanotubes and carbon material other than carbon nanotubes, wherein the carbon nanotubes each having a fiber length in a range of 30 to 500 μm are contained in an amount in a range of 3% by mass or more to less than 100% by mass with respect to a total amount.

In the carbon fiber membrane of the present invention, the membrane can be formed by being composed of only carbon nanotubes and carbon material other than carbon nanotubes without including a binder by containing carbon nanotubes each having a fiber length in a range of 30 to 500 μm in an amount in a range of 3% by mass or more to less than 100% by mass with respect to a total amount. The carbon fiber membrane cannot be formed when the fiber length of the carbon nanotubes is less than 30 μm or when the amount of the carbon nanotubes is less than 3% by mass with respect to the total amount even if the fiber length of the carbon nanotubes is 30 μm or more.

Moreover, the carbon fiber membrane can be formed only by the carbon nanotubes having the fiber length in the above range (containing 100% by mass of the carbon nanotubes having the fiber length in the above range with respect to the total amount). However, in this case, the increase of manufacturing cost cannot be avoided. Accordingly, it is necessary for the carbon fiber membrane of the first aspect of the present invention to contain carbon nanotubes having the fiber length in the above range in the amount in the range of 3% by mass or more to less than 100% by mass with respect to the total amount.

According to the carbon fiber membrane of the present invention, the carbon fiber membrane is composed of only carbon nanotubes and carbon material other than carbon nanotubes, and since it does not contain a binder, it is able to sufficiently increase the electric capacity per mass. Moreover, the carbon fiber membrane of the present invention includes in addition to carbon nanotubes, more inexpensive carbon material other than carbon nanotubes. Therefore, it is able to manufacture the carbon fiber membrane more inexpensively compared to the case of composing the carbon fiber membrane only by carbon nanotubes.

Moreover, it is preferable that the carbon fiber membrane according to the present invention contains the carbon nanotubes each having the fiber length in the above range in a range of 3% by mass to 50% by mass with respect to the total amount in order to manufacture the carbon fiber membrane more inexpensively compared to the case of including only carbon nanotubes.

Moreover, in the carbon fiber membrane according to the present invention, it is able to use either one type among carbon black and activated carbon as the carbon material other than the carbon nanotubes.

Moreover, in the carbon fiber membrane according to the present invention, it is preferable that the carbon nanotubes include first carbon nanotubes having an average fiber length in a range of 10 to 50 μm and second carbon nanotubes having an average fiber length in a range of 100 to 250 μm. In the carbon fiber membrane of the present invention, the carbon nanotubes are composed of the first carbon nanotubes and the second carbon nanotubes, thereby enabling to obtain more excellent tensile strength compared to the case of using only one type of carbon nanotubes having a fiber length in the range of 30 to 500 μm if the total amount of the carbon nanotubes are the same.

In the carbon fiber membrane according to the present invention, in the case where the carbon nanotubes are composed of the first carbon nanotubes and the second carbon nanotubes, for example, the first carbon nanotubes can be contained in an amount in a range of 2 to 15% by mass with respect to the total amount, the second carbon nanotubes can be contained in an amount in an range of 1 to 5% by mass with respect to the total amount, and the carbon material other than the carbon nanotubes can be contained in a range of 80 to 97% by mass with respect to the total amount.

Moreover, the carbon nanotubes can be composed of the first carbon nanotubes having the average fiber length of 30 μm and the second carbon nanotubes having the average fiber length of 125 μm.

Moreover, in the carbon fiber membrane according to the present invention, in the case where the carbon nanotubes are composed of the first carbon nanotubes and the second carbon nanotubes, carbon black may be used as the carbon material other than the carbon nanotubes.

DESCRIPTION OF EMBODIMENTS

In the following, the embodiments of the present invention are described in more detail with reference to the attached drawings.

The carbon fiber membrane of a first aspect of the present embodiment is a carbon fiber membrane composed of only carbon nanotubes and carbon material other than carbon nanotubes, and it is necessary to contain carbon nanotubes having a fiber length in a range of 30 μm to 500 μm in an amount in a range of 3% by mass or more to less than 100% by mass. In a case where the fiber length of the carbon nanotubes is less than 30 μm or in a case where the amount of the carbon nanotubes are less than 3% with respect to the total amount even when the fiber length of the carbon nanotubes is 30 μm or more, it is not able to form the carbon fiber membrane. Here, the carbon nanotubes can be a single layer or a plurality of layers of two layers or more.

Moreover, in the carbon fiber membrane of a second aspect of the present embodiment, the carbon nanotubes include first carbon nanotubes having an average fiber length in a range of 30 to 50 μm and second carbon nanotubes having an average fiber length in a range of 100 to 250 μm. In the carbon fiber membrane of the second aspect of the present embodiment, by having such configuration, it is able to obtain excellent strength compared to the carbon fiber membrane of the first aspect if the total amount of the carbon nanotubes are the same.

The carbon fiber membrane of the second aspect of the present embodiment, for example, the first carbon nanotubes can be contained in an amount in a range of 2 to 15% by mass with respect to the total amount, the second carbon nanotubes can be contained in an amount in an range of 1 to 5% by mass with respect to the total amount, and the carbon material other than the carbon nanotubes can be contained in a range of 80 to 97% by mass with respect to the total amount.

Figure 1:
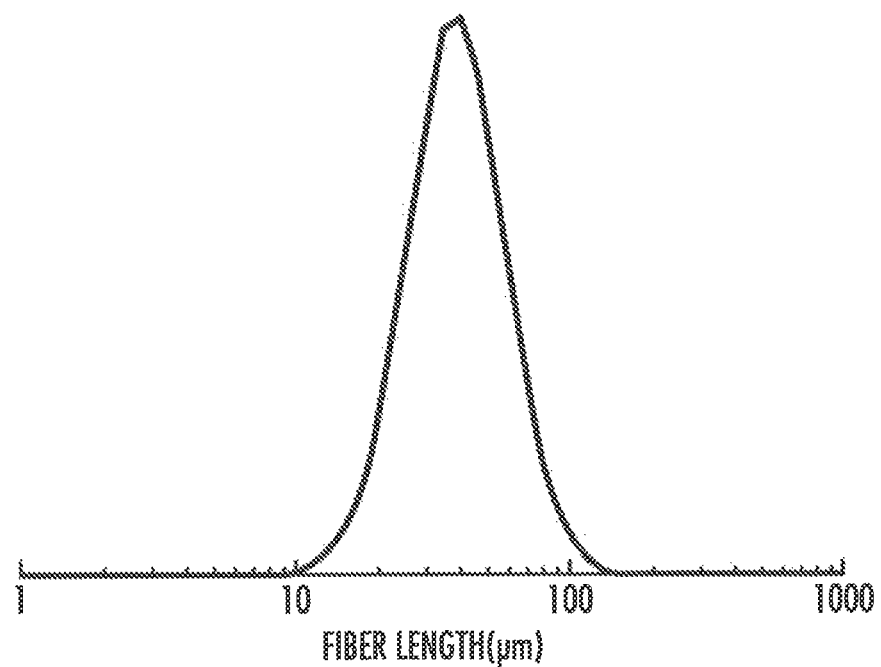
FIG. 1 is a graph showing a frequency distribution of a fiber length of first carbon nanotubes used in a carbon fiber membrane of the present invention.
Figure 2:
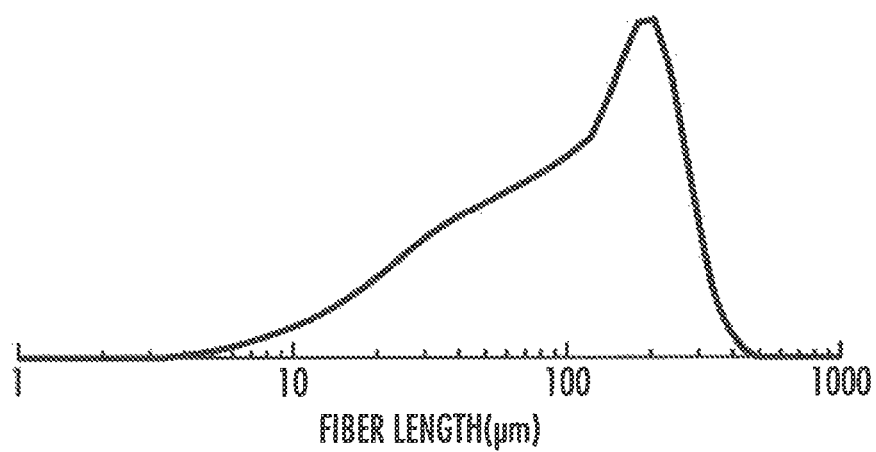
FIG. 2 is a graph showing a frequency distribution of a fiber length of second carbon nanotubes used in the carbon fiber membrane of the present invention.

As the first carbon nanotubes, for example, those having fiber lengths of the frequency distribution shown in FIG. 1 can be used. Furthermore, as the second carbon nanotubes, for example, those having fiber lengths of the frequency distribution shown in FIG. 2 can be used.

As the carbon material other than the carbon nanotubes, for example, graphene, graphite, carbon black, or activated carbon can be used.

The carbon fiber membrane of the present embodiment can be manufactured, for example, as below.

For example, carbon nanotubes having the average fiber length in the range of 50 to 500 μm and carbon material other than the carbon nanotubes are each weighed for a predetermined amount, and dispersed in solvent. The amount of the carbon nanotubes and the carbon material other than the carbon nanotubes is prepared so that the carbon nanotubes are in the range of 10 to 20% by mass and the carbon material other than the carbon nanotubes are 80 to 90% by mass with respect to the total amount thereof.

As the solvent, for example, alcohol, organic solvent such as aprotic polar solvent or the like, or water can be used.

Ethanol or 2-propanol or the like can be used as the alcohol. Moreover, as aprotic polar solvent, N-methylpyrrolidone or the like can be used.

The amount of the solvent does not need to be excessive, but only needs to be an amount capable of dispersing the carbon nanotubes and the carbon material other than carbon nanotubes. Specifically, the amount of the solvent can be prepared in a range of 500 to 1000 times by mass with respect to the total mass of the carbon nanotubes and the carbon material other than the carbon nanotubes.

Next, the fiber length of the carbon nanotubes is adjusted to the predetermined fiber length by stirring the solvent in which the carbon nanotubes and the carbon material other than the carbon nanotubes are dispersed by using a stirring apparatus such as an ultrasonic washer, ball mill, bead mill, homogenizer, jet mill, or the like. It is necessary that the adjustment of the fiber length is done such that the carbon nanotubes having a fiber length of 30 to 500 μm are in the amount of 30% by mass or more and less than 100% by mass with respect to the total amount of carbon nanotubes and the carbon material other than the carbon nanotubes.

Moreover, it is preferable that the adjustment of the fiber length is done such that first carbon nanotubes having an average fiber length in the range of 30 to 50 μm are 2 to 15% by mass and second carbon nanotubes having an average fiber length in the range of 100 to 250 μm are 1 to 5% by mass, with respect to the total amount of the carbon nanotubes and the carbon material other than the carbon nanotubes.

Next, by using the stirring apparatus, the carbon nanotubes having the fiber length adjusted as described above, the carbon material other than the carbon nanotubes, and the solvent are mixed, thereby to prepare a dispersion liquid in which the carbon nanotubes and the carbon material other than the carbon nanotubes are dispersed in the solvent.

Next, the dispersion liquid is filtered using a filter, and a carbon fiber membrane precursor, which is composed of the carbon nanotubes and the carbon material other than the carbon nanotubes, is formed on the filter. The filtering may be performed, for example, by vacuum filtration using a filter made of polytetrafluoroethylene having a pore diameter in the range of 0.2 to 1 μm.

Next, the carbon fiber membrane precursor is dried by a dryer to obtain the carbon fiber membrane of the present embodiment. The drying by the dryer can be performed by holding the carbon fiber membrane precursor, for example, at a temperature of 10 to 30° C. for 5 to 60 minutes.

In the first aspect of the carbon fiber membrane, it is conceived that the carbon nanotubes having the fiber length of 30 to 500 μm are bonded by Van der Waals force with respect to the carbon material other than the carbon nanotubes, and thus the carbon fiber membrane is formed without including a binder.

Moreover, in the second aspect of the carbon fiber membrane, it is conceived that, firstly, the first carbon nanotubes are bonded by the Van der Waals force with respect to the carbon material other than the carbon nanotubes, and thus becoming a state in which contact points are increased by the first carbon nanotubes. Then, the second carbon nanotubes are further bonded to this state by Van der Waals three, and entangled to thereby form the carbon fiber membrane without including the binder.

Next, Examples of the present invention and Comparative Examples are shown.

EXAMPLES

Example 1

In this Example, first, carbon nanotubes having an average fiber length in a range of 50 to 500 μm and carbon black as the carbon material other than the carbon nanotubes, were weighed such that the carbon nanotubes were 10% by mass and the carbon black was 90% by mass with respect to the total amount thereof, and were dispersed in ethanol as the solvent. The amount of solvent was 500 times by mass of the total mass of the carbon nanotubes and the carbon black.

Next, an ultrasonic washer was used as the stirring apparatus, and by mixing the solvent in which the carbon nanotubes and the carbon black was dispersed, the fiber length of the carbon nanotubes was adjusted. As a result, the amount of carbon nanotubes having a fiber length of 30 μm was 3% by mass with respect to the total amount of the carbon nanotubes and the carbon black, and the remaining part was the carbon black.

Next, by using the stirring apparatus, the carbon nanotubes with the fiber length adjusted as above, the carbon black, and the solvent were mixed, and a dispersion liquid in which the carbon nanotubes and the carbon black were dispersed in the solvent was prepared.

Next, the dispersion liquid was filtered by vacuum filtration using a filter made of polytetrafluoroethylene having a pore diameter of 1.0 μm, and a carbon fiber membrane precursor composed of carbon nanotubes and carbon black was formed on the filter. Next, the carbon fiber membrane precursor was held at a temperature of 20° C. for 10 minutes and dried by a dryer.

According to the present Example, the film formability was good, and it was able to obtain the carbon fiber membrane composed of carbon nanotubes and carbon black. The result is shown in Table 1.

Comparative Example 1

In the present Comparative Example, production of a carbon fiber membrane was attempted exactly in the same manner as Example 1 except for not using carbon nanotubes at all, and using only carbon black as the carbon material other than carbon nanotubes. However, the film formability was not good and the carbon fiber membrane was not obtained. The result is shown in Table 1.

Comparative Example 2

In the present Comparative Example, production of a carbon fiber membrane was attempted exactly in the same manner as Example 1 except that, the solvent in which the carbon nanotubes and the carbon black were dispersed was stirred by using the stirring apparatus, and the fiber length of the carbon nanotubes was adjusted such that the amount of carbon nanotubes having a fiber length of 10 μm was made to be 1% by mass with respect to the total amount of the carbon nanotubes and the carbon black. However, the film formability was not good and the carbon fiber membrane could not be obtained. The result is shown in Table 1.

Comparative Example 3

In the present Comparative Example, production of a carbon fiber membrane was attempted exactly in the same manner as Example 1 except that, the solvent in which the carbon nanotubes and the carbon black were dispersed was stirred by using the stirring apparatus, and the fiber length of the carbon nanotubes was adjusted such that the amount of carbon nanotubes having a fiber length of 10 μm was made to be 2% by mass with respect to the total amount of the carbon nanotubes and the carbon black. However, the film formability was not good and the carbon fiber membrane could not be obtained. The result is shown in Table 1.

Comparative Example 4

In the present Comparative Example, production of a carbon fiber membrane was attempted exactly in the same manner as Example 1 except that, the solvent in which the carbon nanotubes and the carbon black were dispersed was stirred by using the stirring apparatus, and the fiber length of the carbon nanotubes was adjusted such that the amount of carbon nanotubes having a fiber length of 10 μm was made to be 3% by mass with respect to the total amount of the carbon nanotubes and the carbon black. However, the film formability was not good and the carbon fiber membrane could not be obtained. The result is shown in Table 1.

Comparative Example 5

In the present Comparative Example, production of a carbon fiber membrane was attempted exactly in the same manner as Example 1 except that, the solvent in which the carbon nanotubes and the carbon black were dispersed was stirred by using the stirring apparatus, and the fiber length of the carbon nanotubes was adjusted such that the amount of carbon nanotubes having a fiber length of 30 μm was made to be 1% by mass with respect to the total amount of the carbon nanotubes and the carbon black. However, the film formability was not good and the carbon fiber membrane could not be obtained. The result is shown in Table 1.

Comparative Example 6

In the present Comparative Example, production of a carbon fiber membrane was attempted exactly in the same manner as Example 1 except that, the solvent in which the carbon nanotubes and the carbon black were dispersed was stirred by using the stirring apparatus, and the fiber length of the carbon nanotubes was adjusted such that the amount of carbon nanotubes having a fiber length of 30 μm was made to be 2% by mass with respect to the total amount of the carbon nanotubes and the carbon black. However, the film formability was not good and the carbon fiber membrane could not be obtained. The result is shown in Table 1.

TABLE 1

|  | CNT | | Film formability |
|---|---|---|---|
|  | Fiber length (μm) | Blending ratio (% by mass) |  |
| Example 1 | 30 | 3 | ○ |
| Comparative Example 1 | — | 0 | x |
| Comparative Example 2 | 10 | 1 | x |
| Comparative Example 3 | 10 | 2 | x |
| Comparative Example 4 | 10 | 3 | x |
| Comparative Example 5 | 30 | 1 | x |
| Comparative Example 6 | 30 | 2 | x |

CNT: Carbon nanotube
Blending ratio: Amount of carbon nanotubes with respect to the total amount of carbon nanotubes and carbon black
Film formability: ○ . . . good, x . . . not good From Table 1, it is clear that the carbon fiber membrane can be obtained only by carbon nanotubes and carbon black without including a binder, by including an amount of 3% by mass of carbon nanotubes having a fiber length of 30 μm with respect to the total amount. On the other hand, it is clear that the carbon fiber membrane cannot be formed when the fiber length of the carbon nanotubes is 30 μm or less, or when the amount of carbon nanotubes is less than 3% by mass with respect to the total amount even when the fiber length of the carbon nanotubes is 30 μm.

Reference Example

In the present Reference Example, a carbon fiber membrane was produced exactly in the same manner as Example 1 except that, the solvent in which the carbon nanotubes and the carbon black were dispersed was stirred by using the stirring apparatus, and the fiber length of the carbon nanotubes was adjusted such that the amount of carbon nanotubes having a fiber length of 30 μm was 100% by mass with respect to the total amount.

Next, the tensile strength of the carbon fiber membrane obtained by the present Reference Example was measured, and it was 6.1 N/mm². The result is shown in Table 2.

Example 2

In the present Example, a carbon fiber membrane was produced exactly in the same manner as Example 1 except that, the solvent in which the carbon nanotubes and the carbon black were dispersed was stirred by using the stirring apparatus, and the fiber length of the carbon nanotubes was adjusted such that the amount of carbon nanotubes having a fiber length of 30 μm was 50% by mass with respect to the total amount, and the remaining amount was carbon black.

Next, the tensile strength of the carbon fiber membrane obtained by the present Example was measured, and it was 2.7 N/mm². The result is shown in Table 2.

Example 3

In the present Example, a carbon fiber membrane was produced exactly in the same manner as Example 1 except that, the solvent in which the carbon nanotubes and the carbon black were dispersed was stirred by using the stirring apparatus, and the fiber length of the carbon nanotubes was adjusted such that the amount of carbon nanotubes having a fiber length of 30 μm was 10% by mass with respect to the total amount, and the remaining amount was carbon black.

Next, the tensile strength of the carbon fiber membrane obtained by the present Example was measured, and it was 0.267 N/mm². The result is shown in Table 2.

Example 4

In the present Example, a carbon fiber membrane was produced exactly in the same manner as Example 3 except that activated carbon was used instead of carbon black.

Next, the tensile strength of the carbon fiber membrane obtained by the present Example was measured, and it was 0.31 N/mm². The result is shown in Table 2.

Example 5

In the present Example, a carbon fiber membrane was produced exactly in the same manner as Example 1 except that, the solvent in which the carbon nanotubes and the carbon black were dispersed was stirred by using the stirring apparatus, and the fiber length of the carbon nanotubes was adjusted such that the amount of carbon nanotubes having a fiber length of 120 μm was 10% by mass with respect to the total amount, and the remaining amount was carbon black.

Next, the tensile strength of the carbon fiber membrane obtained by the present Example was measured, and it was 0.304 N/mm². The result is shown in Table 2.

Example 6

In the present Example, a carbon fiber membrane was produced exactly in the same manner as Example 1 except that, the solvent in which the carbon nanotubes and the carbon black were dispersed was stirred by using the stirring apparatus, and the fiber length of the carbon nanotubes was adjusted such that the amount of carbon nanotubes having a fiber length of 250 μm was 10% by mass with respect to the total amount, and the remaining amount was carbon black.

Next, the tensile strength of the carbon fiber membrane obtained by the present Example was measured, and it was 0.251 N/mm². The result is shown in Table 2.

Example 7

In the present Example, a carbon fiber membrane was produced exactly in the same manner as Example 1 except that, the solvent in which the carbon nanotubes and the carbon black were dispersed was stirred by using the stirring apparatus, and the fiber length of the carbon nanotubes was adjusted such that the amount of carbon nanotubes having a fiber length of 500 μm was 10% by mass with respect to the total amount, and the remaining amount was carbon black.

Next, the tensile strength of the carbon fiber membrane obtained by the present Example was measured, and it was 0.181 N/mm². The result is shown in Table 2.

TABLE 2

|  | CNT | | Carbon material other than CNT | Tensile strength (N/mm²) |
| --- | --- | --- | --- | --- |
|  | Fiber length (μm) | Blending ratio (% by mass) | | |
| Reference Example | 30 | 100 | — | 6.1 |
| Example 2 | 30 | 50 | Carbon black | 2.7 |
| Example 3 | 30 | 10 | Carbon black | 0.267 |
| Example 4 | 30 | 10 | Activated carbon | 0.31 |
| Example 5 | 125 | 10 | Carbon black | 0.267 |
| Example 6 | 250 | 10 | Carbon black | 0.251 |
| Example 7 | 500 | 10 | Carbon black | 0.181 |

CNT: Carbon nanotube
Blending ratio of CNT: Amount of carbon nanotubes with respect to the total amount From Table 2, although the membrane can be formed only from carbon nanotubes as shown by the Reference Example, it is clear that the carbon fiber membrane can be obtained by including 3 to 50% by mass of carbon nanotubes having a fiber length of 30 to 500 μm with respect to the total amount.

Example 8

In the present Example, a carbon fiber membrane was produced exactly in the same manner as Example 1 except that, the solvent in which the carbon nanotubes and the carbon black were dispersed was stirred by using the stirring apparatus, and the fiber length of the carbon nanotubes was adjusted such that the amount of first carbon nanotubes having an average fiber length of 30 μm was 15% by mass and the amount of second carbon nanotubes having an average fiber length of 125 μm was 5% by mass, with respect to the total amount, and the remaining amount was carbon black.

Next, the tensile strength of the carbon fiber membrane obtained by the present Example was measured, and it was 0.76 N/mm$^2$. The result is shown in Table 3.

Example 9

In the present Example, a carbon fiber membrane was produced exactly in the same manner as Example 8 except that the amount of the first carbon nanotubes having the average fiber length of 30 μm was 5% by mass and the amount of the second carbon nanotubes having the average fiber length of 125 μm was 5% by mass, with respect to the total amount, and the remaining amount was carbon black.

Next, the tensile strength of the carbon fiber membrane obtained by the present Example was measured, and it was 0.419 N/mm$^2$. The result is shown in Table 3.

Example 10

In the present Example, a carbon fiber membrane was produced exactly in the same manner as Example 8 except that the amount of the first carbon nanotubes having the average fiber length of 30 μm was 2% by mass and the amount of the second carbon nanotubes having the average fiber length of 125 μm was 1% by mass, with respect to the total amount, and the remaining amount was carbon black.

Next, the tensile strength of the carbon fiber membrane obtained by the present Example was measured, and it was 0.14 N/mm$^2$. The result is shown in Table 3.

TABLE 3

|  | First CNT | | Second CNT | | |
| --- | --- | --- | --- | --- | --- |
|  | Fiber length (μm) | Blending ratio (% by mass) | Fiber length (μm) | Blending ratio (% by mass) | Tensile strength (N/mm$^2$) |
| Example 8 | 30 | 15 | 125 | 5 | 0.76 |
| Example 9 | 30 | 5 | 125 | 5 | 0.419 |
| Example 10 | 30 | 2 | 125 | 1 | 0.14 |

CNT: Carbon nanotube
Fiber length: Average fiber length
Blending ratio: Amount of carbon nanotubes with respect to the total amount From Table 3, it is clear that a carbon fiber membrane having excellent tensile strength can be obtained by using together two types of carbon nanotubes of the first carbon nanotubes and the second carbon nanotubes, such that the amount of the first carbon nanotubes having the average fiber length of 30 μm is 2 to 15% by mass with respect to the total amount and the amount of the second carbon nanotubes having the average fiber length of 125 μm is 1 to 5% by mass with respect to the total amount.

Moreover, from Example 9 of Table 3 and Examples 3 to 7 of Table by using together two types of carbon nanotubes such as the first carbon nanotubes and the second carbon nanotubes, it is clear that a carbon fiber membrane having significantly excellent tensile strength can be obtained compared to the case of using only one type of carbon nanotubes having a fiber length of 30 to 500 μm, if the total amount of the carbon nanotubes is the same.

EXPLANATION OF REFERENCE NUMERALS

No reference numerals.
The invention claimed is:
1. A carbon fiber membrane consisting of carbon nanotubes and carbon material other than carbon nanotubes,
   wherein the carbon nanotubes each having a fiber length in a range of 30 to 500 μm are contained in a range greater than or equal to 3% by mass and less than 100% by mass with respect to a total mass of the carbon fiber membrane,
   wherein the carbon nanotubes include first carbon nanotubes having a first average fiber length in a range of 30 to 50 μm and second carbon nanotubes having a second average fiber length in a range of 100 to 250 μm, and
   wherein the carbon material other than the carbon nanotubes is either one type among carbon black and activated carbon.
2. The carbon fiber membrane according to claim 1, wherein the carbon nanotubes having the fiber length in the range of 30 to 500 μm are contained in a range of 3% to 50% by mass with respect to the total mass of the carbon fiber membrane.
3. The carbon fiber membrane according to claim 1, wherein the carbon nanotubes include the first carbon nanotubes having the first average fiber length of 30 μm and the second carbon nanotubes having the second average fiber length of 125 μm.
4. The carbon fiber membrane according to claim 1, wherein the carbon material other than the carbon nanotubes is carbon black.
5. A carbon fiber membrane consisting of carbon nanotubes and carbon material other than carbon nanotubes,
   wherein the carbon nanotubes each having a fiber length in a range of 30 to 500 μm are contained in a range greater than or equal to 3% by mass and less than 100% by mass with respect to a total mass of the carbon fiber membrane,
   wherein the carbon nanotubes include first carbon nanotubes having a first average fiber length in a range of 30 to 50 μm and second carbon nanotubes having a second average fiber length in a range of 100 to 250 μm, and
   wherein the first carbon nanotubes are contained in a range of 2% to 15% by mass with respect to the total mass of the carbon fiber membrane, the second carbon nanotubes are contained in a range of 1% to 5% by mass with respect to the total mass of the carbon fiber membrane, and the carbon material other than the carbon nanotubes are contained in a range of 80% to 97% by mass with respect to the total mass of the carbon fiber membrane.
6. The carbon fiber membrane according to claim 5, wherein the carbon nanotubes include the first carbon nanotubes having the first average fiber length of 30 μm and the second carbon nanotubes having the second average fiber length of 125 μm.
7. The carbon fiber membrane according to claim 5, wherein the carbon material other than the carbon nanotubes is carbon black.

* * * * *